(12) United States Patent
Kataoka et al.

(10) Patent No.: US 7,480,161 B2
(45) Date of Patent: Jan. 20, 2009

(54) CONTROL APPARATUS FOR SEMICONDUCTOR POWER CONVERTER

(75) Inventors: Akihisa Kataoka, Saitama (JP); Tomotsugu Ishizuka, Tokyo (JP); Koichi Hidese, Tokyo (JP); Shigeru Tanaka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/782,263

(22) Filed: Jul. 24, 2007

(65) Prior Publication Data

US 2008/0037300 A1 Feb. 14, 2008

(30) Foreign Application Priority Data

Aug. 11, 2006 (JP) .............................. 2006-220528

(51) Int. Cl.
- H02M 1/12 (2006.01)
- H02M 7/122 (2006.01)
- H02M 3/24 (2006.01)
- H02M 7/155 (2006.01)

(52) U.S. Cl. ...................... 363/41; 363/56.02; 363/98; 363/130

(58) Field of Classification Search .................. 363/37, 363/41, 56.01, 98, 87, 92, 129, 56.02, 56.03, 363/130, 132; 323/237, 910

See application file for complete search history.

(56) References Cited

U.S. PATENT DOCUMENTS 4,811,187 A * 3/1989 Nakajima et al. ............. 363/25

6,169,677 B1 * 1/2001 Kitahata et al. ............... 363/71

FOREIGN PATENT DOCUMENTS

JP 2003-274675 9/2003

* cited by examiner

Primary Examiner—Jessica Han
Assistant Examiner—Emily Pham
(74) Attorney, Agent, or Firm—Oblon, Spivak, McClelland, Maier & Neustadt, P.C.

(57) ABSTRACT

A control apparatus for controlling a three- or single-phase semiconductor power converter employing fixed-pulse switching patterns superposes a DC component on an AC output voltage, to suppress asymmetrical magnetization of a transformer connected to the power converter.

The three-phase semiconductor power converter 1 provides an AC output. The voltage of the AC output is changed by the transformer 12. The control apparatus 14 for controlling the power converter 1 includes an asymmetrical magnetization suppressive controller 15 to generate a correction value for each of basic fixed-pulse switching patterns to be applied to three-phase switching elements of the power converter 1, a phase corrector 16 to switch the correction values from one to another at timing when no switching operation is carried out at any one of the switching elements, and a pattern generator 17 to correct the basic fixed-pulse switching patterns according to the correction value provided by the phase corrector 16 and provide the corrected switching patterns.

4 Claims, 9 Drawing Sheets

- W1 Triangular wave
- W2+ Modulated wave (Output voltage command value + $\alpha$ )
- W2 Output voltage command value

- W3 Triangular wave
- W4+ Modulated wave (Output voltage command value + $\alpha$ )
- W4 Output voltage command value

CONTROL APPARATUS FOR SEMICONDUCTOR POWER CONVERTER

CROSS REFERENCE TO RELATED APPLICATION

The present application claims the benefit of priority under 35 U.S.C. §119 to Japanese Patent Application No. 2006-220528, filed on Aug. 11, 2006, the entire contents of which are incorporated herein by reference.

BACKGROUND OF THE INVENTION

1. Field of the Invention

The present invention relates to a control apparatus for a semiconductor power converter, and particularly, to a control apparatus for controlling the superposing of a DC component on an AC output from a semiconductor power converter employing fixed-pulse switching patterns.

2. Description of Related Art

A three- or single-phase semiconductor power converter conducts a switching operation that causes the asymmetrical magnetization of a transformer connected to the power converter. The asymmetrical magnetization of the transformer is also caused by an AC load, an AC system, and the like involving the power converter, to produce an asymmetrical magnetization overcurrent. For protection against the asymmetrical magnetization overcurrent, the power converter must be stopped. This results in stopping the supply of power to the load.

FIG. 1 is a view showing a principle of pulse width modulation (PWM) carried out in a standard three-phase semiconductor power converter. In FIG. 1, a triangular wave W1 is a carrier wave and a modulated wave W2 corresponds to a command value for an output voltage to be generated by the power converter. The waves W1 and W2 are compared with each other, to turn on/off semiconductor switching elements, so that the power converter may provide a voltage corresponding to the command value.

FIG. 2 is a view showing a principle of PWM carried out in a standard single-phase semiconductor power converter. In FIG. 2, a triangular wave W3 is a carrier wave and a modulated wave W4 corresponds to a command value for an output voltage to be generated by the power converter. The waves W3 and W4 are compared with each other, to turn on/off semiconductor switching elements, so that the power converter may provide a voltage corresponding to the command value.

The power converter of any one of FIGS. 1 and 2 is connected to a transformer to constitute a power system. The transformer causes core saturation. To prevent the core saturation, asymmetrical magnetization must be suppressed. For this, PWM of each of the three- and single-phase semiconductor power converters shown in FIGS. 1 and 2 employs a modulated wave W2+ (W4+) formed by superposing a DC component α on the modulated wave W2 (W4). Superposing a DC component on an AC output of a semiconductor power converter is effective to suppress the asymmetrical magnetization of a transformer connected to the power converter.

There is a semiconductor power converter that employs fixed-pulse switching patterns for PWM control. The PWM control employing fixed-pulse switching patterns is advantageous in reducing harmonics even if a gate pulse switching frequency is low. This method, however, is unable to change an AC amplitude, and therefore, is unable to superpose a DC component on an AC output, unlike the conventional PWM control that compares a carrier wave with a modulated wave to generate a gate pulse. There is, therefore, a need for developing a new asymmetrical magnetization suppressive control technique.

An example of the related art is disclosed in Japanese Unexamined Patent Application Publication No. 2003-274675. The publication discloses that, in the one-pulse single-phase bridge voltage type self-excitation converter as shown in its accompanying FIG. 1, a plurality of self-quenching type devices 1A, 1B, 1C, and 1D are subjected to bridge connection, an AC terminal is connected to a power system or a load 4, and at the same time a DC terminal is connected to a DC capacitor 3. It further discloses that the one-pulse single-phase bridge voltage type self-excitation converter has a pulse width calculation means 5 for calculating a desired pulse width according to the fundamental effective value of the AC output voltage being outputted to the AC terminal, and means 7, 8, 9, 10, 11, 28, and 29 for adding one portion of the pulse width of the AC output voltage to an output voltage phase, subtracting the remaining pulse width where one portion is subtracted from the phase of the AC output voltage, calculating a phase command value of each arm in the one-pulse single-phase bridge voltage type self-excitation converter, and generating the gate pattern of the self-quenching devices 1A, 1B, 1C, and 1D of each arm.

SUMMARY OF THE INVENTION

In consideration of the problems of the related art, an object of the present invention is to provide a control apparatus for controlling a three- or single-phase semiconductor power converter employing fixed-pulse switching patterns, capable of suppressing the asymmetrical magnetization of a transformer connected to the power converter by superposing a DC component on an AC output voltage of the power converter.

In order to accomplish the object, a first aspect of the present invention provides a control apparatus for controlling a three-phase semiconductor power converter employing fixed-pulse switching patterns and connected to a transformer on its AC side. The control apparatus includes an asymmetrical magnetization suppressive controller configured to generate a correction value for each of basic fixed-pulse switching patterns to be applied to three-phase switching elements of the power converter according to a magnetic flux, an excitation current or a value representative of any one of them detected from the transformer; a phase corrector configured to switch the correction values from one to another at timing when no switching operation is carried out at any one of the switching elements; and a pattern generator configured to correct the basic fixed-pulse switching patterns according to the correction value provided by the phase corrector and provide the corrected switching patterns.

According to the first aspect mentioned above, the control apparatus controls a three-phase semiconductor power converter employing fixed-pulse switching patterns by generating a correction value for each of basic fixed-pulse switching patterns to be applied to three-phase switching elements of the power converter, by switching the correction values from one to another at timing when no switching operation is carried out at any one of the switching elements, and by correcting the basic fixed-pulse switching patterns according to the correction value so that a DC component is superposed on an AC output from the power converter. The control apparatus can suppress, in terms of every phase, the asymmetrical magnetization of a transformer connected to the power converter, prevent an overcurrent, and secure continuous operation.

A second aspect of the present invention provides a control apparatus for controlling a single-phase semiconductor power converter employing fixed-pulse switching patterns and connected to a transformer. The control apparatus includes an asymmetrical magnetization suppressive controller configured to generate a correction value for each of basic fixed-pulse switching patterns to be applied to switching elements of the power converter according to a magnetic flux, an excitation current or a value representative of any one of them detected from the transformer; a phase corrector configured to switch the correction values from one to another at timing when no switching operation is carried out at any one of the switching elements; and a pattern generator configured to correct the basic fixed-pulse switching patterns according to the correction value provided by the phase corrector and provide the corrected switching patterns.

According to the second aspect of the present invention, the control apparatus controls a single-phase semiconductor power converter employing fixed-pulse switching patterns by generating a correction value for each of basic fixed-pulse switching patterns to be applied to switching elements of the power converter, by switching the correction values from one to another at timing when no switching operation is carried out at any one of the switching elements, and by correcting the basic fixed-pulse switching patterns according to the correction value so that a DC component is superposed on an AC output from the power converter. The control apparatus can suppress, in terms of every phase, the asymmetrical magnetization of a transformer connected to the power converter, prevent an overcurrent, and secure continuous operation.

DETAILED DESCRIPTION OF EMBODIMENTS

Figure 1:
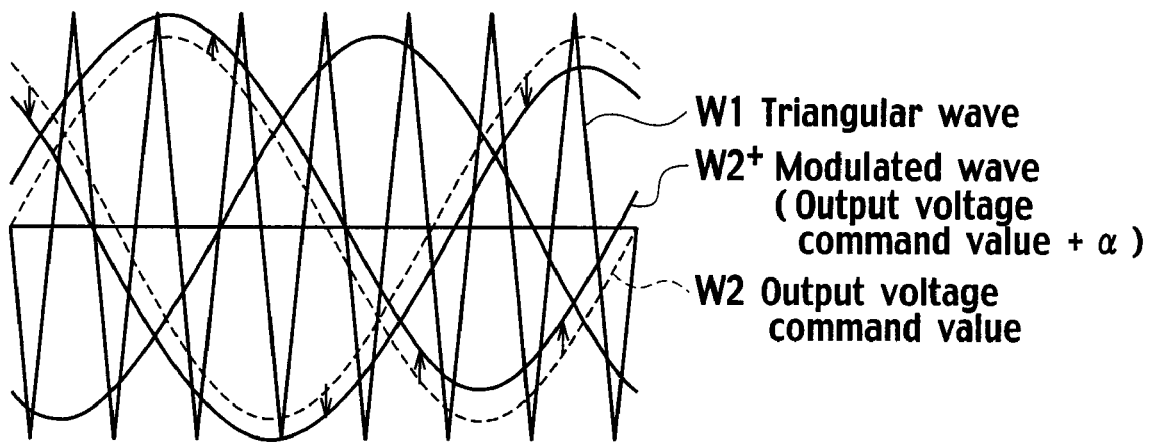
FIG. 1 shows waveforms including a carrier wave, a modulated wave, and a DC-corrected modulated wave according to a conventional three-phase PWM control.
Figure 2:
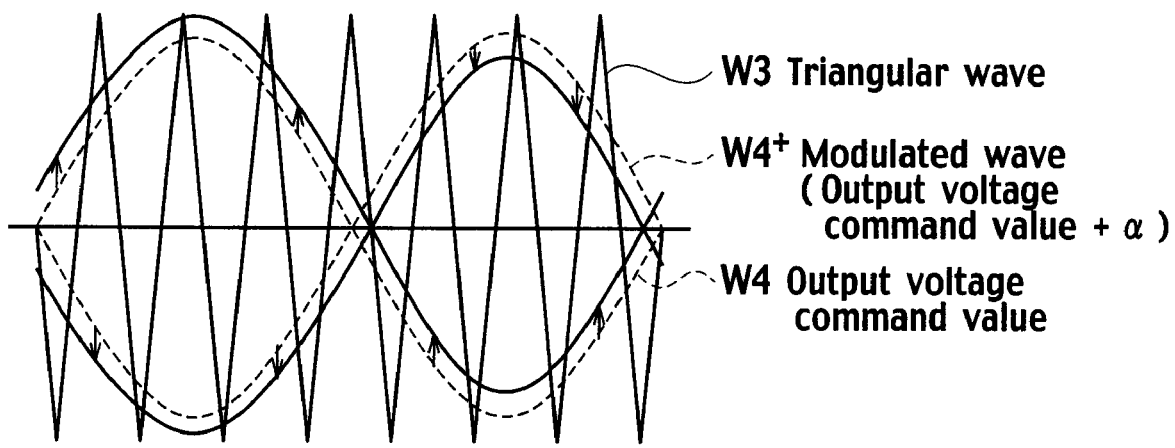
FIG. 2 shows waveforms including a carrier wave, a modulated wave, and a DC-corrected modulated wave according to a conventional single-phase PWM control.
Figure 3:
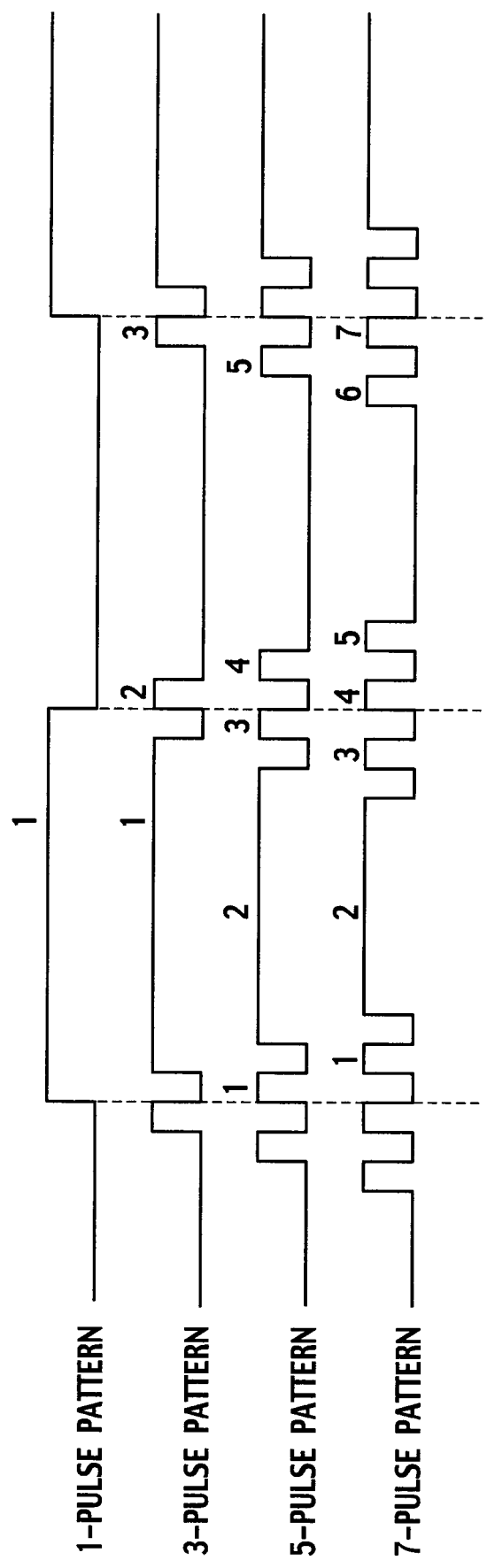
FIG. 3 is a view showing 1-, 3-, 5-, and 7-fixed-pulse switching patterns used to drive a standard semiconductor power converter.

Embodiments of the present invention will be explained in detail with reference to the accompanying drawings. First, a principle of asymmetrical magnetization suppressive control of the present invention for a three-phase semiconductor power converter employing fixed-pulse switching patterns will be explained with reference to FIGS. 3 and 4. FIG. 3 shows 1-, 3-, 5-, and 7-fixed-pulse switching patterns used to drive a semiconductor power converter. The 1-fixed-pulse switching pattern generates a pulse in a period of 360°, the 3-fixed-pulse switching pattern generates three pulses in the same period, the 5-fixed-pulsed switching pattern generates five pulses in the same period, and the 7-fixed-pulse switching pattern generates seven pulses in the same period.

The fixed-pulse switching control is unable to increase the wave height of a positive pulse and decrease the wave height of a negative pulse. Instead, the fixed-pulse switching control manipulates the phases of positive and negative pulses, to increase an absolute positive integral value greater than an absolute negative integral value, or an absolute negative integral value greater than an absolute positive integral value. In this embodiment, an absolute positive integral value is made greater than an absolute negative integral value by α in every period, to thereby superpose a DC component on an AC output of the power converter.

Figure 4:
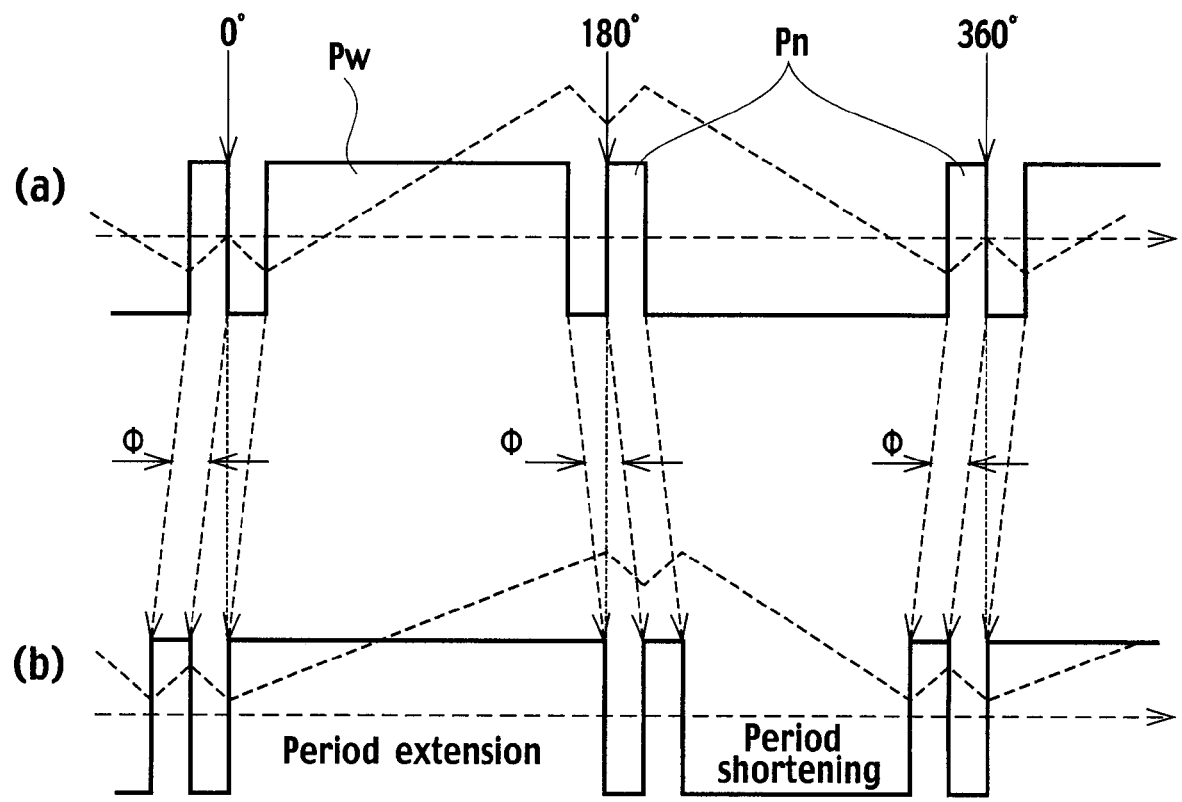
FIG. 4 shows waveforms for explaining a principle of DC component superposition achieved by phase-shifting a 3-fixed-pulse switching pattern.

Phase manipulation for increasing the absolute integral value of a positive pulse greater than that of a negative pulse will be explained with reference to FIG. 4. Fixed-pulse switching control shown in FIG. 4 employs a 3-fixed-pulse switching pattern. A waveform (a) in FIG. 4 is a pulse waveform in each period includes two narrow pulses Pn and one wide pulse Pw. To generate a DC component, the wide pulse Pw is widened by a slight quantity in each positive period and is slightly narrowed by the same quantity in each negative period as shown by a waveform (b) in FIG. 4. In the case of a three-phase operation, the wide pulse Pw is adjusted by 4° at each end without overlapping the switching timing of the other phases. As a result, an absolute integral value of the positive pulse becomes larger than that of the negative pulse, to thereby superpose a DC component on an output of the power converter.

First Embodiment

Figure 5:
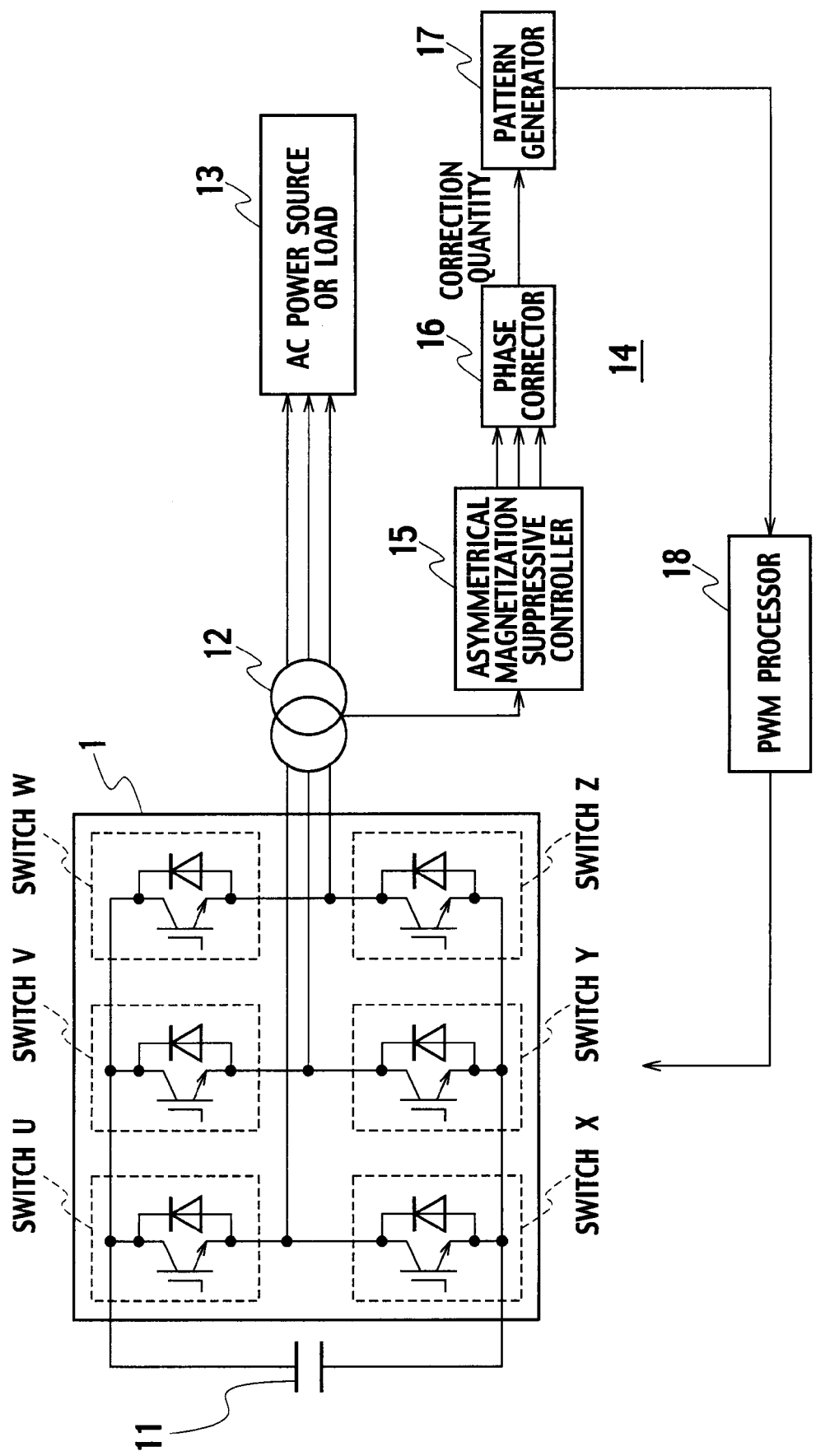
FIG. 5 is a block diagram showing a control apparatus for controlling a three-phase semiconductor power converter employing fixed-pulse switching patterns, according to a first embodiment of the present invention.

A control apparatus for controlling a three-phase semiconductor power converter employing fixed-pulse switching patterns, according to the first embodiment of the present invention will be explained with reference to FIGS. 5 and 6. In FIG. 5, the three-phase semiconductor power converter 1 has switching elements U, V, W, X, Y, and Z. The switching elements U and X form a U-X arm, the switching elements V and Y form a V-Y arm, and the switching elements W and Z form a W-Z arm. The power converter 1 converts three-phase power into DC power, or DC power into three-phase power. On a DC side, the power converter 1 is connected to a DC power source or a DC capacitor 11, and on an AC side, the power converter 1 is connected to a three-phase transformer 12. The transformer 12 is connected to an AC power source or a load 13.

The control apparatus 14 for the power converter 1 includes an asymmetrical magnetization suppressive controller 15, a phase corrector 16, a pattern generator 17, and a PWM processor 18. The asymmetrical magnetization suppressive controller 15 calculates correction values according to magnetic flux, excitation current, or a value representative of any one of them detected from the transformer 12. The PWM processor 18 carries out a PWM process to provide gate signals to the switching elements.

Figure 6:
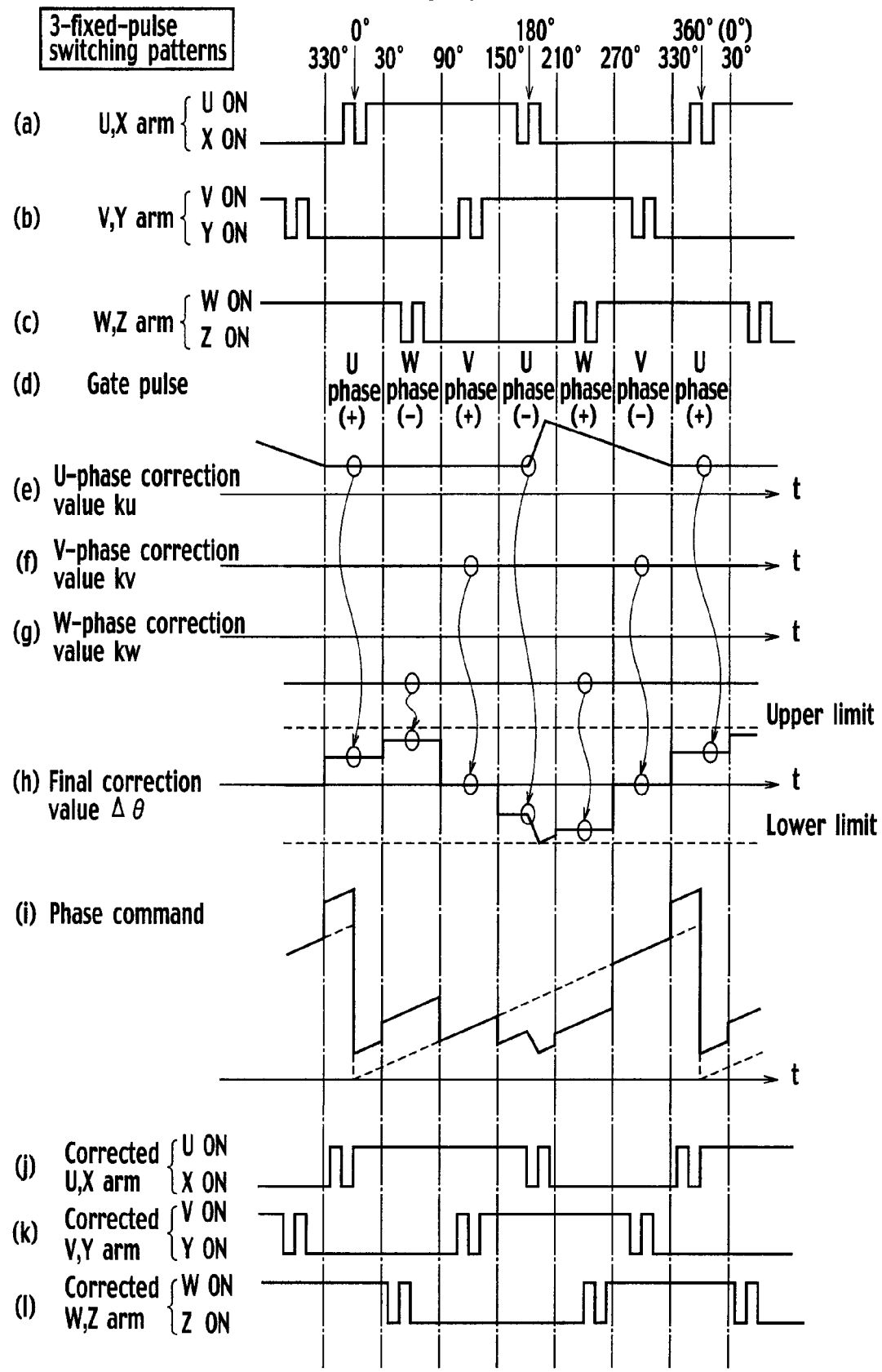
FIG. 6 shows waveforms including fixed-pulse switching patterns before correction, correction values, a phase command, and corrected fixed-pulse switching patterns in the control apparatus according to the first embodiment.

Waveforms (a) to (c) in FIG. 6 show 3-fixed-pulse switching patterns originally produced for the U-X, V-Y, and W-Z arms of the power converter 1, respectively. A waveform (d) in FIG. 6 shows gate pulses for the U, V, and W phases. Waveforms (e) to (g) in FIG. 6 show correction values generated by the asymmetrical magnetization suppressive controller 15 for the U, V, and W phases, respectively. A waveform (h) in FIG. 6 shows final correction values. A waveform (i) in FIG. 6 shows a phase command provided by the phase corrector 16. Waveforms (j) to (l) in FIG. 6 show corrected 3-fixed-pulse switching patterns provided by the pattern generator 17 for the respective arms.

The asymmetrical magnetization suppressive controller 15 provides U-, V-, and W-phase correction values ku, kv, and kw for the before-correction 3-fixed-pulse switching patterns set for the U-X, V-Y, and W-Z arms, respectively. The phase corrector 16 switches the correction values ku, kv, and kw from one to another at timing when no switching operation is carried out at any one of the switching elements of the U-X, V-Y, and W-Z arms. To superpose a DC component, the control apparatus 14 conducts a phase shift at timing that is out of the switching period of each arm and is farthest from the switching period of each arm. In this embodiment, a phase shift is conducted at the timing of 30°, 90°, 150°, 210°, 270°, and 330°. In a given period, the phase corrector 16 chooses the correction value of a phase whose arm conducts a switching operation in the given period and continuously provides the pattern generator 17 with the chosen correction value up to the next phase shift timing. According to the correction value, the pattern generator 17 generates the corrected switching patterns shown in the waveforms (j) to (l) to be supplied to the switching elements of the U-X, V-Y, and W-Z arms, respectively.

Based on the corrected switching patterns from the pattern generator 17, the PWM processor 18 conducts a PWM process to drive the switching elements of the U-X, V-Y, and W-Z arms in the power converter 1.

In this way, the control apparatus 14 according to the first embodiment controls the three-phase semiconductor power converter 1 employing fixed-pulse switching patterns by switching correction values from one to another at timing when no switching operation is carried out at any one of the switching elements, so that a DC component is superposed on an AC output from the power converter 1. The control apparatus 14 can suppress asymmetrical magnetization of the transformer 12 and prevent an overcurrent between the power converter 1 and the transformer 12. Consequently, the first embodiment prevents an overcurrent and secures continuous operation.

Second Embodiment

A control apparatus for controlling a three-phase semiconductor power converter employing fixed-pulse switching patterns, according to the second embodiment of the present invention will be explained with reference to FIGS. 5 and 7. The second embodiment employs the same parts as the first embodiment.

Figure 7:
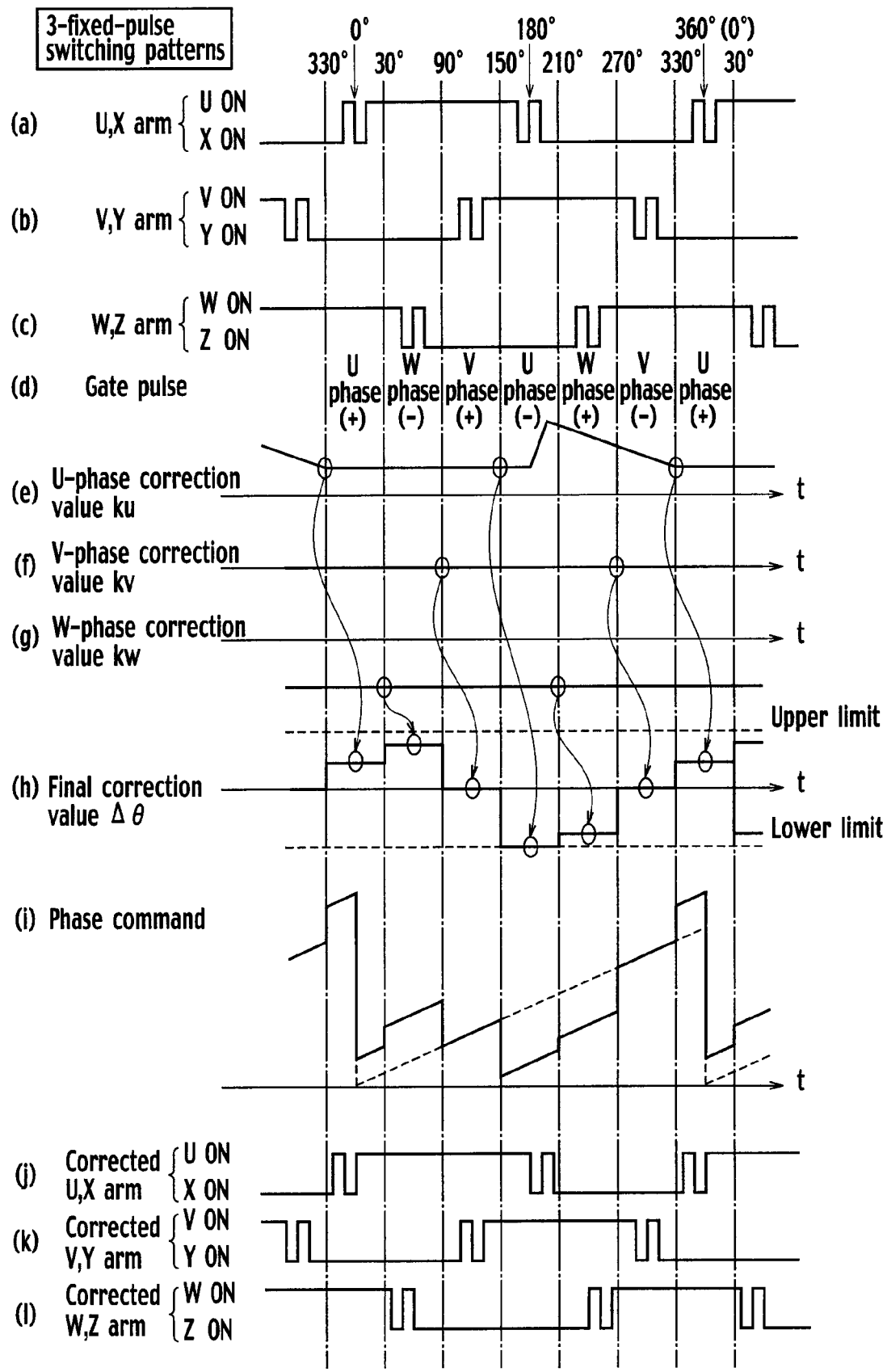
FIG. 7 shows waveforms including fixed-pulse switching patterns before correction, correction values, a phase command, and corrected fixed-pulse switching patterns in a control apparatus for controlling a three-phase semiconductor power converter, according to a second embodiment of the present invention.

In FIG. 7, the second embodiment is characterized in that the phase corrector 16 samples, in a given period, a correction value of the phase that involves a switching operation in the given period from among the correction values provided by the asymmetrical magnetization suppressive controller 15 and holds the sampled correction value up to the next phase shift timing.

The control apparatus 14 according to the second embodiment controls the three-phase semiconductor power converter 1 employing fixed-pulse switching patterns by switching correction values from one to another at timing when no switching operation is carried out at any one of the switching elements, so that a DC component is superposed on an AC output from the power converter 1. The control apparatus 14 can suppress asymmetrical magnetization of the transformer 12 and prevent an overcurrent between the power converter 1 and the transformer 12. Consequently, the second embodiment prevents an overcurrent and secures continuous operation. In particular, the second embodiment can prevent a phase instruction from having a negative slope that may unnecessarily increase the number of switching events in the power converter 1.

Third Embodiment

A control apparatus for controlling a single-phase semiconductor power converter employing fixed-pulse switching patterns, according to the third embodiment of the present invention will be explained with reference to FIGS. 8 and 9. Parts of the third embodiment that are the same as those of the first embodiment shown in FIGS. 5 and 6 are represented with the same reference marks and repetitive explanations are omitted.

Figure 8:
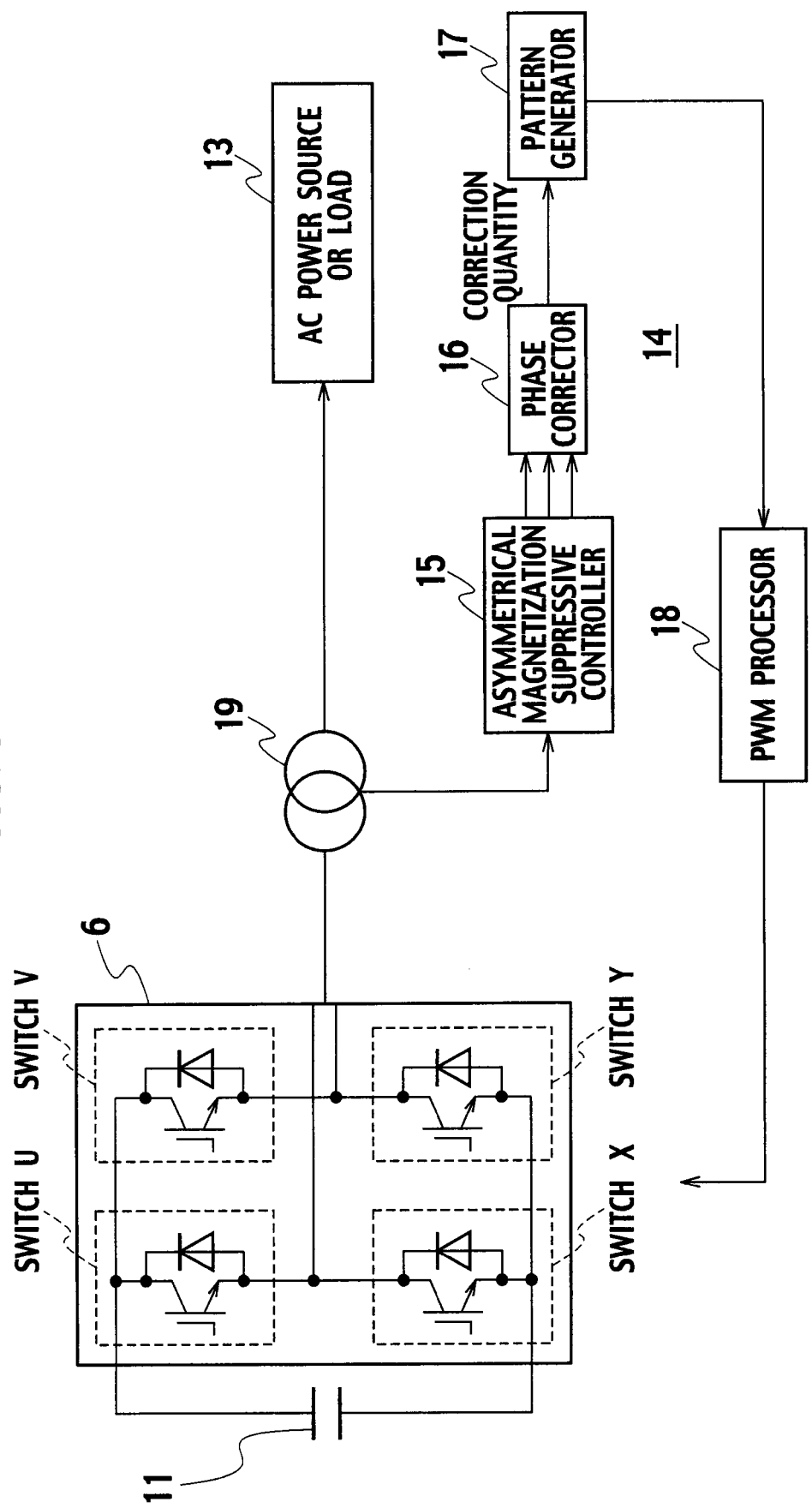
FIG. 8 is a block diagram showing a control apparatus for controlling a single-phase semiconductor power converter employing fixed-pulse switching patterns, according to a third embodiment of the present invention.

In FIG. 8, the single-phase semiconductor power converter 6 includes switching elements U, V, X, and Y. The switching elements U and X form a U-X arm and the switching elements V and Y form a V-Y arm. On a DC side, the power converter 6 is connected to a DC power source or a DC capacitor 11, and on an AC side, the power converter 1 is connected to a single-phase transformer 19. The transformer 19 is connected to an AC power source or a load 13. The control apparatus 14 for the power converter 6 includes an asymmetrical magnetization suppressive controller 15, a phase corrector 16, a pattern generator 17, and a PWM processor 18. The asymmetrical magnetization suppressive controller 15 calculates correction values according to magnetic flux, excitation current, or a value representative of any one of them detected from the transformer 19. The PWM processor 18 carries out a PWM process to provide the switching elements with gate signals.

Figure 9:
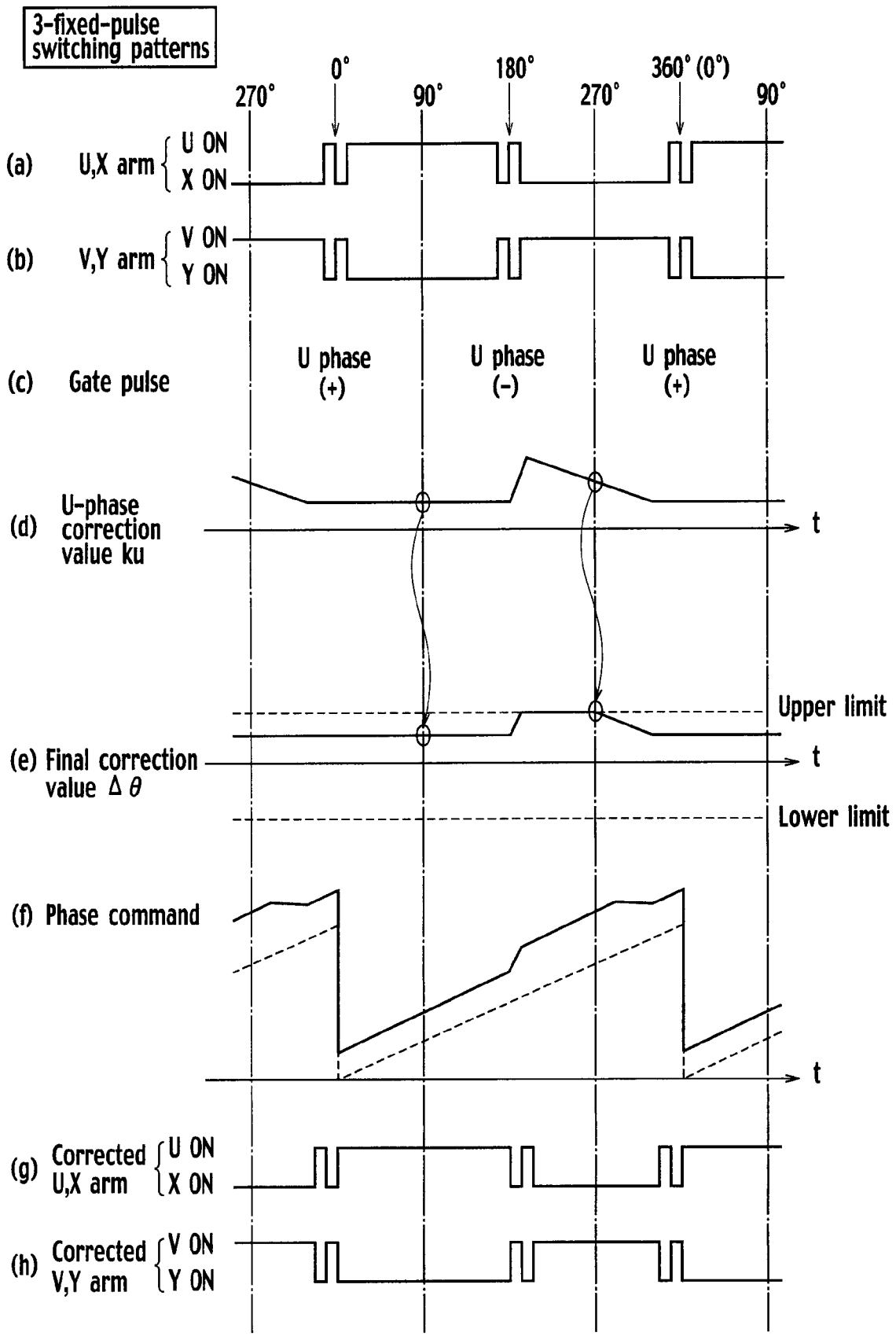
FIG. 9 shows waveforms including fixed-pulse switching patterns before correction, correction values, a phase command, and corrected fixed-pulse switching patterns in the control apparatus according to the third embodiment.

Waveforms (a) and (b) in FIG. 9 show 3-fixed-pulse switching patterns originally produced for the U-X and V-Y arms of the power converter 6, respectively. A waveform (c) in FIG. 9 shows gate pulses for the U and V phases. FIG. 7D shows a correction value generated by the asymmetrical magnetization suppressive controller 15 for the U phase. A waveform (e) in FIG. 9 shows final correction values. A waveform (f) in FIG. 9 shows a phase command provided by the phase corrector 16. Waveforms (g) and (h) in FIG. 9 show corrected 3-fixed-pulse switching patterns provided by the pattern generator 17 for the respective arms.

The asymmetrical magnetization suppressive controller 15 provides a U-phase correction value ku for the before-correction 3-fixed-pulse switching patterns set for the U-X and V-Y arms. The phase corrector 16 changes the correction value at timing when no switching operation is carried out at any one of the switching elements of the U-X and V-Y arms. To superpose a DC component, the control apparatus 14 conducts a phase shift at timing that is out of the switching period of each arm and is farthest from the switching period of each arm. In this embodiment, a phase shift is conducted at 90° and 270°. In a given period, the phase corrector 16 chooses the correction value of a phase whose arm conducts a switching operation in the given period and continuously provides the pattern generator 17 with the chosen correction value up to the next phase shift timing. According to the correction value, the pattern generator 17 generates the corrected switching patterns as the waveforms (g) and (h) in FIG. 9 to be supplied to the switching elements of the U-X and V-Y arms.

In this way, the control apparatus 14 according to the third embodiment controls the single-phase semiconductor power converter 6 employing fixed-pulse switching patterns by changing a correction value at timing when no switching operation is carried out at any one of the switching elements, so that a DC component is superposed on an AC output from the power converter 6. The control apparatus 14 can suppress asymmetrical magnetization of the transformer 19 and prevent an overcurrent between the power converter 6 and the transformer 19. Consequently, the third embodiment prevents an overcurrent and secures continuous operation.

Fourth Embodiment

A control apparatus for controlling a single-phase semiconductor power converter employing fixed-pulse switching patterns, according to the fourth embodiment of the present invention will be explained with reference to FIGS. 8 and 10. The fourth embodiment employs the same parts as the third embodiment.

Figure 10:
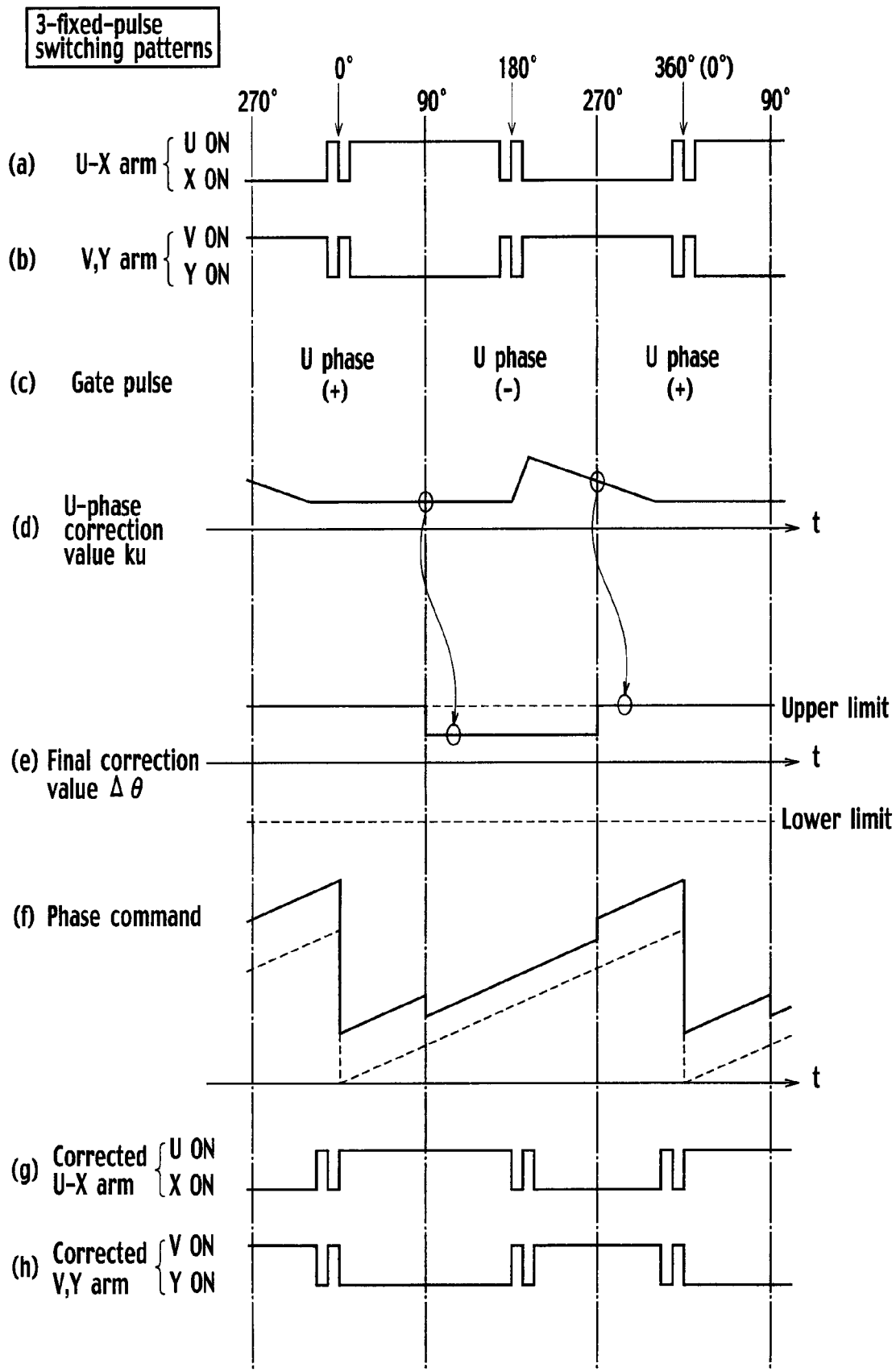
FIG. 10 shows waveforms including fixed-pulse switching patterns before correction, correction values, a phase command, and corrected fixed-pulse switching patterns in a control apparatus for controlling a single-phase semiconductor power converter, according to a fourth embodiment of the present invention.

In FIG. 10, the fourth embodiment is characterized in that the phase corrector 16 samples, in a given period, a correction value of the phase that involves a switching operation in the given period from among the correction values provided by the asymmetrical magnetization suppressive controller 15 and holds the sampled correction value up to the next phase shift timing.

The control apparatus 14 according to the fourth embodiment controls the single-phase semiconductor power converter 6 employing fixed-pulse switching patterns by changing a correction value at timing when no switching operation is carried out at any one of the switching elements, so that a DC component is superposed on an AC output from the power converter 6. The control apparatus 14 can suppress asymmetrical magnetization of the transformer 19 and prevent an overcurrent between the power converter 6 and the transformer 19. Consequently, the fourth embodiment prevents an overcurrent and secures continuous operation. In particular, the fourth embodiment can prevent a phase instruction from having a negative slope that may unnecessarily increase the number of switching events in the power converter 6.

What is claimed is:

1. A control apparatus for controlling a three-phase semiconductor power converter employing fixed-pulse switching patterns and connected to a transformer on its AC side, comprising:

an asymmetrical magnetization suppressive controller configured to generate a correction value for each of basic fixed-pulse switching patterns to be applied to three-phase switching elements of the power converter according to a magnetic flux, an excitation current or a value representative of any one of them detected from the transformer;

a phase corrector configured to switch the correction values from one to another at timing when no switching operation is carried out at any one of the switching elements; and a pattern generator configured to correct the basic fixed-pulse switching patterns according to the correction value provided by the phase corrector and provide the corrected switching patterns.

2. The control apparatus of claim 1, wherein:

the phase corrector samples and holds one of the correction values provided by the asymmetrical magnetization suppressive controller and provides the pattern generator with the sampled-and-held correction value at given timing.

3. A control apparatus for controlling a single-phase semiconductor power converter employing fixed-pulse switching patterns and connected to a transformer on its AC side, comprising:

an asymmetrical magnetization suppressive controller configured to generate a correction value for each of basic fixed-pulse switching patterns to be applied to switching elements of the power converter according to a magnetic flux, an excitation current or a value representative of any one of them detected from the transformer;

a phase corrector configured to switch the correction values from one to another at timing when no switching operation is carried out at any one of the switching elements; and a pattern generator configured to correct the basic fixed-pulse switching patterns according to the correction value provided by the phase corrector and provide the corrected switching patterns.

4. The control apparatus of claim 3, wherein:

the phase corrector samples and holds one of the correction values provided by the asymmetrical magnetization suppressive controller and provides the pattern generator with the sampled-and-held correction value at given timing.

* * * * *